United States Patent [19]

Burke et al.

[11] Patent Number: 4,673,054
[45] Date of Patent: Jun. 16, 1987

[54] SAFETY BRAKE SYSTEM

[75] Inventors: Raymond W. Burke; Herman W. B. Tiedke; Brian C. Barton, all of New Brunswick, Canada

[73] Assignee: Thomas Equipment Ltd., New Brunswick, Canada

[21] Appl. No.: 734,352

[22] Filed: May 14, 1985

[30] Foreign Application Priority Data

May 15, 1984 [CA] Canada ................................ 454319

[51] Int. Cl.$^4$ ............................................. B60K 28/00
[52] U.S. Cl. ..................................... 180/271; 74/563; 180/90.6; 180/286
[58] Field of Search ............... 180/271, 275, 279, 286, 180/289, 287, 272, 90.6; 74/563, 512, 566, 560, 564; 188/151 A; 296/75, 1 F; 70/199, 200, 203, 205, 237, 238

[56] References Cited

U.S. PATENT DOCUMENTS

| Re. 30,152 | 11/1979 | Davis | 74/609 |
|---|---|---|---|
| 913,406 | 2/1909 | Last | 180/90.6 |
| 1,285,093 | 11/1918 | Fishel | 70/237 |
| 1,335,532 | 3/1920 | Sleeper | 70/203 |
| 1,448,462 | 3/1923 | Ryan | 70/199 |
| 3,014,754 | 12/1961 | Thurkow | 180/90.6 |
| 3,863,729 | 2/1975 | Von Fummetti et al. | 180/69.2 |
| 3,865,210 | 2/1975 | Von Fummetti et al. | 180/69.2 |
| 4,008,583 | 2/1977 | Davis | 180/271 |
| 4,099,593 | 7/1978 | Schultz | 180/289 |
| 4,155,417 | 5/1979 | Ziems | 180/271 |
| 4,209,075 | 6/1980 | Messina | 180/272 |
| 4,318,571 | 3/1982 | Vize | 180/286 |
| 4,355,819 | 10/1982 | Frisbee | 180/271 |
| 4,366,881 | 1/1983 | Frisbee | 180/271 |
| 4,391,344 | 7/1983 | Weber | 180/271 |
| 4,429,761 | 2/1984 | Haddock | 180/271 |

FOREIGN PATENT DOCUMENTS

| 57063 | 8/1982 | European Pat. Off. | 180/271 |
|---|---|---|---|
| 1380042 | 1/1975 | United Kingdom | 70/237 |

Primary Examiner—John J. Love
Assistant Examiner—Everett G. Diedericks, Jr.
Attorney, Agent, or Firm—Jones, Tullar, Cooper

[57] ABSTRACT

A safety system for a vehicle having foot operated hydraulic controls consisting in one embodiment of a safety shield which activates a parking brake so that when the shield is in a lowered position the parking brake is set and the shield covers the hydraulic controls of the vehicle as well as being a foot rest, and when the shield is in upright position, the parking brake is released and access is obtained to the hydraulic controls; and in another embodiment of a safety bar which activates a locking lever which prevents operation of the foot controls when the safety bar is raised and permits operation of the foot controls when the safety bar is lowered.

12 Claims, 8 Drawing Figures

SAFETY BRAKE SYSTEM

This invention relates to a safety system on a skid steer loader which utilizes a safety shield or safety bar connected to a parking brake actuator and also arranged to prevent operation of the hydraulic foot-controls when required.

BACKGROUND OF THE INVENTION

In a skid steer loader and in other similar types of construction, farm and logging equipment there is a parking brake which is operated directly by the operator and there are also hydraulic controls which are foot operated for controlling the hydraulic boom and bucket cylinder actuators. When an operator has to enter the loader, he has to step onto various parts of the equipment in order to reach the operating position. There is always the danger, when entering or leaving the loader, that the operator will accidentally step upon the brake or hydraulic controls. Furthermore, the parking brake, although it should always be set when leaving the loader, is sometimes inadvertently left in its off position and, as the engine of a loader is normally left operating during most of an operating shift even when the loader is left inactive for short lengths of time, the vibration will sometimes cause the loader to move.

SUMMARY OF THE INVENTION

In this invention there is provided in one aspect, a parking brake which is operated by a combined foot rest and safety shield. When the operator is outside the loader, the safety shield and foot rest is in a horizontal position and in this position automatically sets the parking brake. The foot rest and safety shield also is positioned above the hydraulic boom and bucket controls so preventing accidental operation of the actuators. When the operator wishes to climb up into the operating position on the loader, he steps upon the foot rest and safety shield and when wishing to operate the loader lifts up the safety shield into an upright position which automatically releases the parking brake and also exposes the hydraulic controls. When the safety shield is in the upright position, it also acts as a rock guard for the operator's legs.

In another aspect of the invention, as well as the safety shield and foot rest, a safety bar is used which can be raised upwardly for operator entry and exit and can be lowered for protection purposes when the operator is in position. This safety bar is connected through linkage which operates the safety shield and foot rest; the parking brake, and also a lock for the machine drive. A safety start switch is also operated by the safety shield so that the engine cannot be started unless the safety shield is in its lowered position which means that the safety bar is its raised position, the machine drive is locked in the neutral position and the parking brake is set.

In a further aspect of the invention, where there is a lack of space as in a small loader, the safety shield of the last aspect, is dispensed with and the safety bar is connected to a locking lever which prevents movement of the hydraulic foot controls and the parking brake.

Embodiments of the invention will now be described with reference to the accompanying drawings.

DESCRIPTION OF PREFERRED EMBODIMENTS

Figure 1:
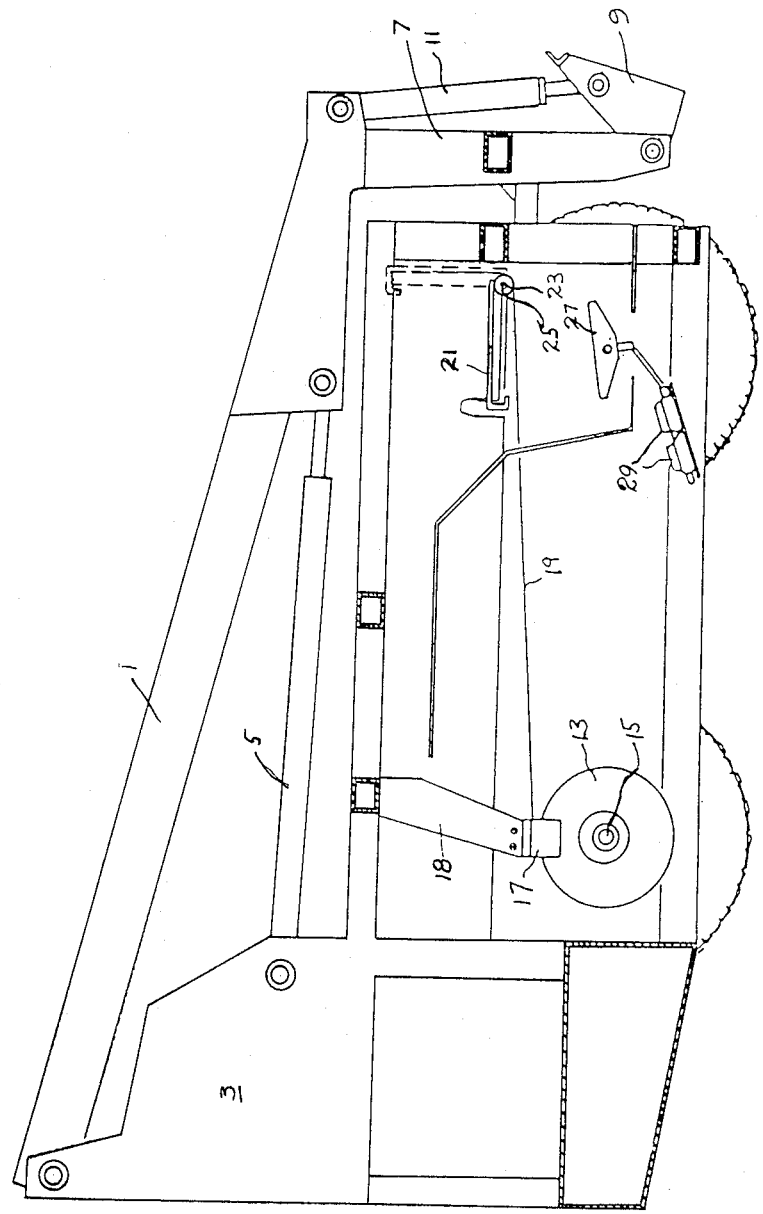
FIG. 1 is a diagrammatic side elevational view of a skid steer loader incorporating this invention.

Referring to FIG. 1 there is shown diagrammatically a skid steer loader which has a boom 1 pivotally secured to a frame member 3 and operated by an hydraulic boom actuator 5. The boom 1 has an extension 7 upon which a bucket 9 is pivotally attached and is operated by an hydraulic actuator 11. A brake disk 13 is secured to an extension shaft 15 from the end of the transmission (not shown), and a brake caliper mechanism 17 is secured to the frame through a bracket 18. The brake mechanism 17 is operated through a cable 19. Details of the brake caliper mechanism are not shown as any known mechanism will suffice, such being well known in the field.

A flat plate 21 is pivotally mounted along one edge, through a hinge 23, to the frame of the loader and is capable of movement between a lower position shown in full lines and an upright position shown in broken lines. The end of the cable 19 is secured with the outer wire sleeve on a bracket (not shown) and the inner wire around a small actuating disk 25 which rotates with the plate 21. Beneath the plate 21 there are the normal hydraulic controls for the boom and the bucket which utilize foot pedal means 27 and operating valves 29.

When the operator leaves the loader, he opens a latch, of any well known design, which holds the plate 21 in upright position and lets the plate fall to a lowered position. He then stands upon the plate 21 which sets the brake through the cable 19, and the plate snaps below a latch, of any known design to hold the brake in set position. He then uses plate 21 as a foot plate and steps from it to the ground. Note that when the plate 21 is in its lowered position, it is not possible for the operator to inadvertently stand upon the foot pedal means 27 as it is completely shielded. To climb up again into the loader, the operator uses plate 21 as a foot rest, and after sitting in the operator's seat, opens the latch which holds the plate 21 in lowered position, lifts the plate into an upright position and pushes it behind the upper latch. He can then operate the foot pedal means 27 while the plate 21, in its upright position, acts as a stone guard.

Figure 2:
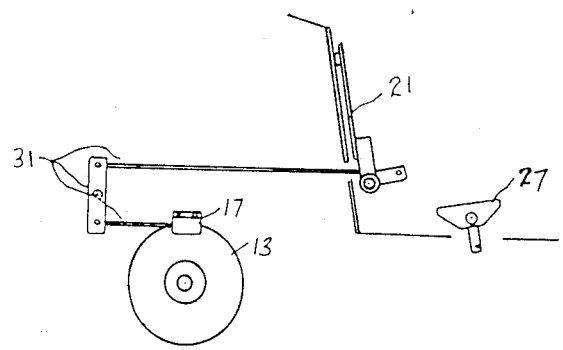
FIG. 2 is a diagrammatic view of the inventive part of the apparatus of FIG. 1 with the safety shield in upright position.
Figure 3:
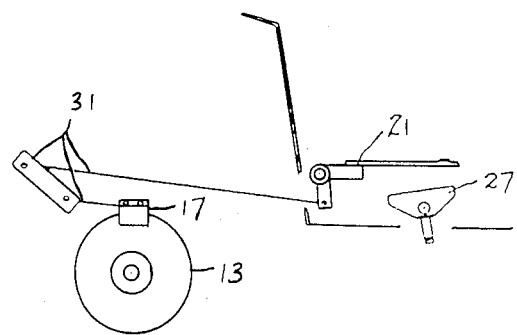
FIG. 3 is a diagrammatic view of the novel part of FIG. 1 with the safety shield in lowered position.

Referring to FIGS. 2 and 3, diagrammatic views show only the operating part of the invention, plate 21 being shown in upright position in FIG. 2 and in lowered position in FIG. 3, and in these two Figures there is utilized a lever and rod mechanism 31 for operating the brake caliper mechanism 17.

Figure 4:
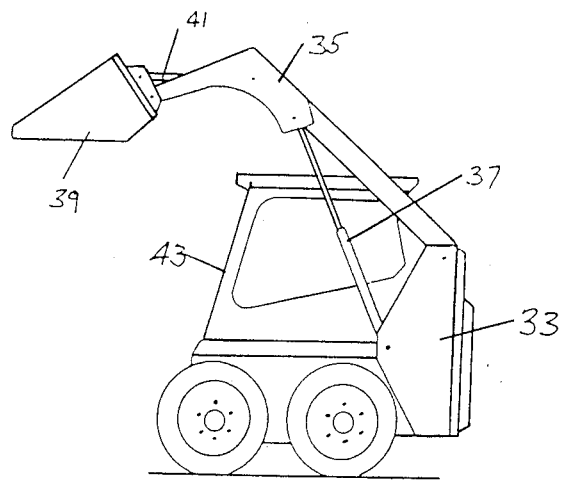
FIG. 4 is a diagrammatic side elevational view of another type of skid steer loader.

FIG. 4 shows a different type of skid steer loader which, however, has the same basic elements as the loader in FIG. 1. The loader of FIG. 4 has a frame 33, a boom 35, an hydraulic boom actuator 37, a bucket 39 and an hydraulic bucket actuator 41.

Figure 5:
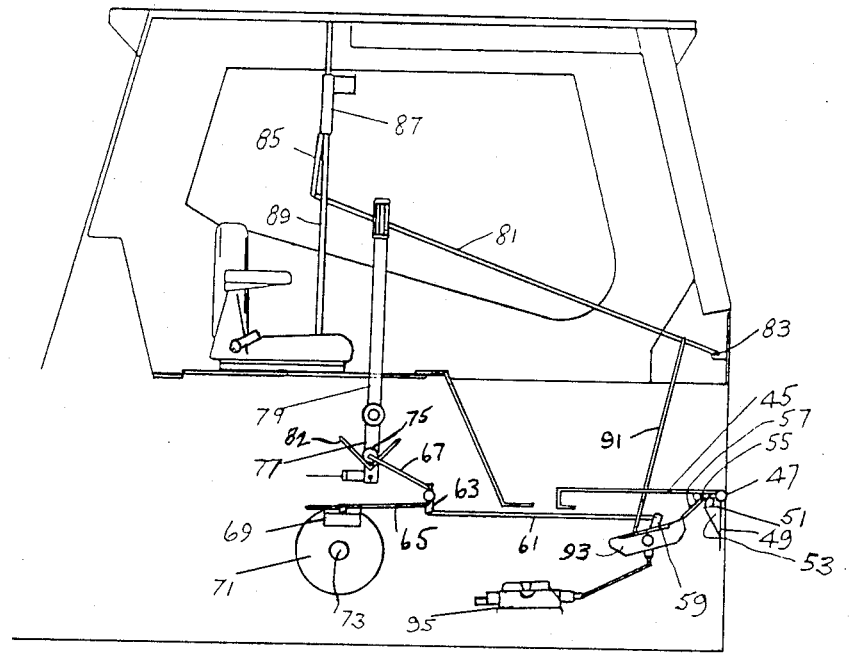
FIG. 5 is a diagrammatic view of the cab part of the skid steer loader of FIG. 4 showing the safety shield in lowered position.
Figure 6:
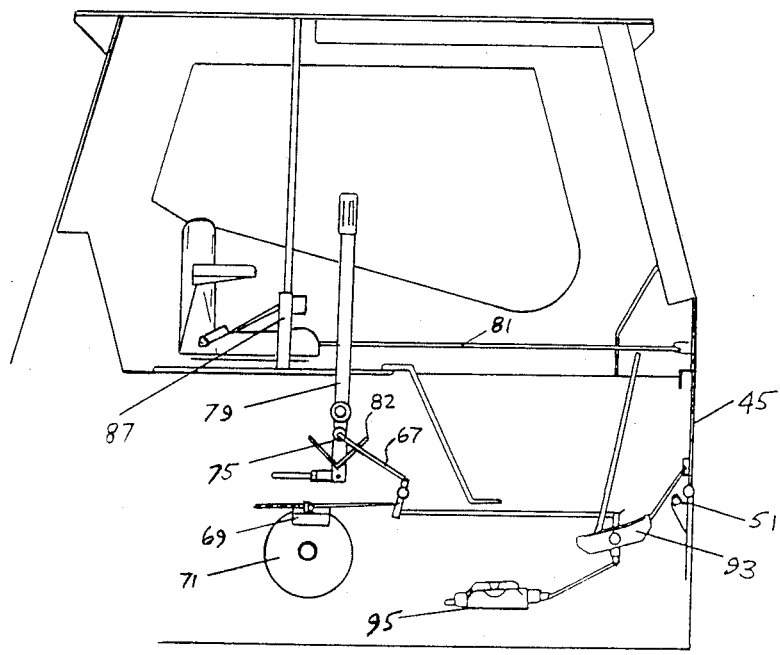
FIG. 6 is a diagrammatic view of the cab part of FIG. 4 showing the safety shield in upright position.

FIGS. 5 and 6 show enlarged views of the internal components in the cab 43 which provide more safety features than those outlined in the embodiments of the invention shown in FIGS. 1, 2 and 3.

Specifically, there is a shield and foot rest 45 which is hinged at 47 to a member 49 of the frame. A safety start switch 51 which can be of the plunger type is mounted upon a bracket 53 and is wired into the starting circuit to only permit starting of the loader engine when the plate 45 is in the lowered position. A bracket 55 is secured away from the hinge 47 and a rod 57 is pivotally secured to the bracket 55 and extends to one arm of bell crank lever 59. The other end of bell crank lever 59 has a rod 61 extending to one arm of a pivoted lever 63 to which is attached a rod 65 and a rod 67. Rod 65 actuates a brake caliper mechanism 69 upon a brake disk 71 which is secured to an extension shaft 73 from a transmission (not shown). No details of the brake caliper mechanism are provided as such are considered conventional. The other rod 67 has a roller 75 at its free end, roller 75 being capable of travelling within a channel 77 which is the lower part of pivoted drive engaging lever 79. An angled bracket 82 is secured in a fixed position so that when roller 75 is pulled downwardly in the angle bracket, the drive engaging lever 79 is made immobile.

A safety bar 81 is loosely pivoted at one end 83 and has a short rod 85 pivotally mounted at the other end. The short rod 85 is itself pivotally secured to a sleeve 87 which can slide along an upright rigidly secured rod 89. The sleeve is preferably provided with a rudimentary gripping means (not shown) which can hold the sleeve in any required position on the rod 89. Near end 83 of rod 81 there is pivotally attached a further rod 91 which is secured to an arm (not shown) of bell crank 59.

The operating pedal means 93 for activating the hydraulic central valves 95 for the boom and bucket operation, are situated below the plate 45.

When an operator enters the loader of FIGS. 4 through 6, he steps upon plate 45 and positions himself in the seat, and due to the location of plate 45 which is in the position as shown in FIG. 5, it is not possible for him to accidentally operate the hydraulic central valve 95. The prime mover of the loader can then be started, this being permitted by the switch 51 which allows activation of the starting circuit as it is closed by the plate 45 when this plate is in lowered position. After starting the prime mover, the sleeve 87 is pulled downwardly, causing rotation of rod 81, activation of bell crank 59, rotation of plate 45 to an upright position, release of parking brake 69, and release of the drive operating lever 79 by raising of roller 75 into its uppermost position. The release position of all the controls is shown in FIG. 6. Plate 45, in its upright position also provides a stone guard for the operator and also provides access to the hydraulic controls for the boom and bucket.

When the operator wishes to leave the loader, he raises the sleeve 87 which lowers plate 45, sets the parking brake 69, and locks the drive control lever 79. The lowering of plate 45 again covers the hydraulic controls 93 and 95 and plate 45 is used as a foot rest for ease in leaving the loader.

Figure 7:
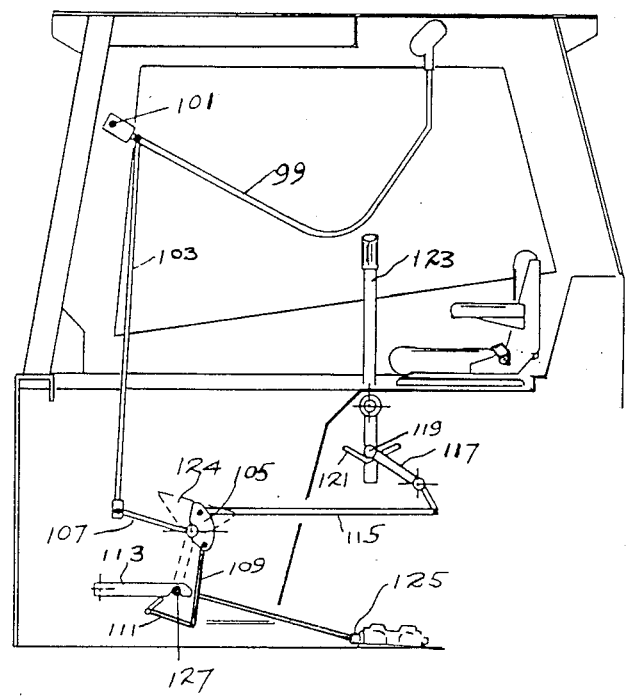
FIGS. 7 and 8 are diagrammatic views of another embodiment of this invention.
Figure 8:
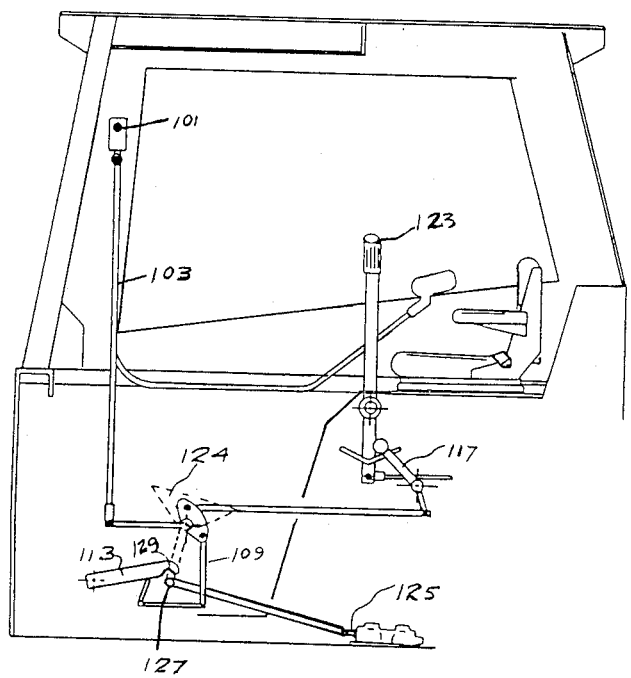

Referring to FIGS. 7 and 8, when there is a lack of space in a loader the safety shield of the embodiment shown in FIGS. 5 and 6 can be dispensed with and a safety bar 99 can be used to solely control the safety features. Safety bar 99 is pivoted at 101 and has a rod 103 which operates a bell crank lever 105 through an operating lever 107. A lower rod 109 from the bell crank lever 105 is connected to a cranked lever 111 which has a free end in contact with a downwardly spring biased locking lever 113. A horizontally extending rod 115 from bell crank lever 105 is connected to a pivoted lever 117 which has a roller 119 at its other end. This roller 119, in co-operation with angled bracket 121 operates to selectively hold the lever 123 in inoperative position as in the previous embodiment. Hydraulic foot controls 124 are shown in broken lines and operate a braking and/or other system through control valves 125, a pin 127 being used at a pivot between the foot controls and the control valves, which will co-operate with a notch 129 in the locking lever 113. In operation, when the safety bar 99 is raised, as shown in FIG. 7, lever 123 is held in inoperative position by roller 119 and angled bracket 121 and the foot controls 124 are held in a set position by lever 113.

In this position, the parking brake system would be set and the control valves would be in a neutral position. After the operator enters the loader, the safety bar will be lowered to the position shown in FIG. 8, so releasing the control valves 125 and the operating lever 123. The parking brake can also preferably be released by the safety bar movement. If required, the safety bar can operate an electrical safety switch so that the engine of the loader cannot be started until the safety bar is pulled down into operative position.

It will therefore be noted that a safety system has been disclosed which ensures the safe operation of skid steer loader so that accidental operation of hydraulic controls is not possible while the operator is entering or leaving the loader nor will the loader accidentally move as the parking brake is set until the operator is in operating position. Of course this safety system can be used with advantage in many types of logging equipment, construction equipment, and farm equipment which utilize hydraulic controls for bucket or grader operation.

The invention will be limited only by the scope of the claims which follow.

The embodiments of the invention in which an exclusive property or privilege is claimed are defined as follows:

1. A safety system for a vehicle having a parking brake and having foot-operated hydraulic controls, comprising:

a safety shield mounted on said vehicle for motion between an upright position which provides access to said hydraulic controls and a lowered position in which said shield covers said hydraulic controls and provides a generally horizontal foot rest; and means connecting said shield to said parking brake to operate said parking brake so that when the shield is in its lowered position the parking brake is set and the shield covers the hydraulic controls of the vehicle so as to be usable as a foot rest and when the shield is in its upright position, the parking brake is released and access to the hydraulic controls is available, whereby the shield prevents accidental operation of the hydraulic controls when an operator is entering or leaving the vehicle by way of the foot rest.

2. The system of claim 1, wherein the shield operates the parking brake through a cable operating means.

3. The system of claim 1, wherein the shield operates the parking brake through a lever and rod operating means.

4. The system of claim 1, further including a safety starting switch which is located in a position such that it will only permit starting of a prime mover of the vehicle when the shield is in its lowered position.

5. The system of claim 4, wherein the switch is operated by direct contact with the shield.

6. The safety system of claim 4, further including safety bar means and first linkage means connecting said safety bar means to said shield, whereby movement of said safety bar moves said shield between said upright and said lowered positions.

7. The system of claim 1, further including:
- a drive engaging means including a machine drive lever for said vehicle;
- moveable lock means engageable to hold said drive lever in a neutral position;
- a safety bar pivotally mounted on said vehicle and connected to said shield and to said lock means so that lifting of said safety bar moves the shield to its lowered position and moves said lock to hold said machine drive lever in its neutral position.

8. The safety system of claim 7, further including switch means responsive to the position of said safety shield to permit starting of a vehicle prime mover only when said safety shield is in said lowered position.

9. A safety system for a vehicle having foot-operated hydraulic controls, comprising:
- a safety shield pivotally mounted on said vehicle and movable between an upright position and a lowered position, said shield in its upright position providing access to said foot-operated controls and in said lowered position serving as a foot rest and covering said foot-operated controls to prevent access thereto by a vehicle operator;
- means responsive to the position of said shield to operate a vehicle parking brake so that said brake is activated when said safety shield is in said lowered position and is released when said safety shield is in said upright position;
- switch means responsive to the position of said safety shield to permit starting of a vehicle prime mover only when said safety shield is in said lowered position;
- safety bar means;
- first linkage means connecting said safety bar means to said shield means, whereby movement of said safety bar moves said shield means between said upright and said lowered positions;
- vehicle drive engaging lever means; and
- second linkage means responsive to movement of said safety bar and said first linkage means to immobilize or to release said drive engaging lever means.

10. The safety system of claim 9, further including switch means responsive to the position of said safety shield to permit starting of a vehicle prime mover only when said safety shield is in said lowered position.

11. The safety system of claim 10, wherein said means responsive to the position of said shield to operate a vehicle parking brake includes a lever and rod mechanism.

12. The safety system of claim 10, wherein said means responsive to the position of said shield to operate a vehicle parking brake includes a cable operating system.

* * * * *